(12) United States Patent
Li et al.

(10) Patent No.: US 9,379,795 B1
(45) Date of Patent: Jun. 28, 2016

(54) METHOD AND APPARATUS FOR USING MULTIPLE CODEBOOKS FOR WIRELESS TRANSMISSION TO A PLURALITY OF USERS IN A CELL

(71) Applicant: Marvell International Ltd., Hamilton (BM)

(72) Inventors: Yu-Ngok Li, Mountain View, CA (US); Raphael Cendrillon, Kennedy Town (HK)

(73) Assignee: Marvell International Ltd., Hamilton (BM)

( * ) Notice: Subject to any disclaimer, the term of this patent is extended or adjusted under 35 U.S.C. 154(b) by 224 days.

(21) Appl. No.: 13/913,020

(22) Filed: Jun. 7, 2013

Related U.S. Application Data

(63) Continuation of application No. 12/755,246, filed on Apr. 6, 2010, now Pat. No. 8,462,716, which is a continuation-in-part of application No. 12/170,649, filed on Jul. 10, 2008, now Pat. No. 8,125,884, and a continuation-in-part of application No. 12/167,788, filed on Jul. 3, 2008, now Pat. No. 7,995,528.

(60) Provisional application No. 61/167,714, filed on Apr. 8, 2009, provisional application No. 60/950,453, filed on Jul. 18, 2007, provisional application No. 60/949,134, filed on Jul. 11, 2007.

(51) Int. Cl.
*H04W 4/00* (2009.01)
*H04B 7/04* (2006.01)

(52) U.S. Cl.
CPC .................................. *H04B 7/0456* (2013.01)

(58) Field of Classification Search
None
See application file for complete search history.

(56) References Cited

U.S. PATENT DOCUMENTS

| | | | |
|---|---|---|---|
| 7,746,936 | B2 | 6/2010 | Kwon et al. |
| 7,961,640 | B2 | 6/2011 | Prakash et al. |
| 7,995,528 | B1 | 8/2011 | Cendrillon et al. |
| 8,213,870 | B2 | 7/2012 | Zhang et al. |
| 8,462,716 | B1 | 6/2013 | Li et al. |
| 8,503,384 | B1 | 8/2013 | Cendrillon et al. |
| 8,644,765 | B1 | 2/2014 | Zhang et al. |
| 9,083,401 | B2 | 7/2015 | Zhang et al. |
| 2005/0063378 | A1 | 3/2005 | Kadous |
| 2006/0190245 | A1 | 8/2006 | Iser et al. |
| 2006/0209980 | A1 | 9/2006 | Ho-Jin |
| 2007/0005749 | A1 | 1/2007 | Sampath |
| 2007/0049218 | A1 | 3/2007 | Gorokhov et al. |
| 2007/0155336 | A1 | 7/2007 | Nam et al. |
| 2007/0189148 | A1 | 8/2007 | Garmonov et al. |
| 2007/0206504 | A1 | 9/2007 | Koo et al. |

(Continued)

FOREIGN PATENT DOCUMENTS

| WO | WO-01029986 | 4/2001 |
|---|---|---|
| WO | WO-2006138337 | 12/2006 |
| WO | WO-2009051748 | 4/2009 |

OTHER PUBLICATIONS

"Non-Final Office Action", U.S. Appl. No. 14/171,269, Oct. 3, 2014, 8 pages.

(Continued)

*Primary Examiner* — Robert C Scheibel

(57) ABSTRACT

Systems and/or methods are described for use of progressively higher-resolution codebooks for communication with one or more receivers within a cell of a base station.

15 Claims, 14 Drawing Sheets

(56) References Cited

U.S. PATENT DOCUMENTS

| | | | |
|---|---|---|---|
| 2007/0249402 A1* | 10/2007 | Dong et al. | 455/562.1 |
| 2007/0253501 A1 | 11/2007 | Yamaura | |
| 2008/0004076 A1* | 1/2008 | Adachi et al. | 455/560 |
| 2008/0080637 A1 | 4/2008 | Khan et al. | |
| 2008/0117867 A1 | 5/2008 | Yin et al. | |
| 2008/0219373 A1 | 9/2008 | Zhang et al. | |
| 2008/0292012 A1 | 11/2008 | Kim et al. | |
| 2008/0299917 A1 | 12/2008 | Alexiou et al. | |
| 2009/0097395 A1 | 4/2009 | Zhang et al. | |
| 2009/0129286 A1* | 5/2009 | Beser | 370/252 |
| 2009/0232245 A1* | 9/2009 | Lakkis | 375/267 |
| 2009/0274225 A1* | 11/2009 | Khojastepour et al. | 375/260 |
| 2009/0274230 A1* | 11/2009 | Heath et al. | 375/260 |
| 2009/0310586 A1 | 12/2009 | Shatti | |
| 2010/0189079 A1* | 7/2010 | Eichinger et al. | 370/335 |
| 2011/0007685 A1* | 1/2011 | Ma et al. | 370/329 |
| 2012/0281659 A1* | 11/2012 | Zhang et al. | 370/329 |
| 2014/0146909 A1 | 5/2014 | Zhang | |

OTHER PUBLICATIONS

"Advisory Action", U.S. Appl. No. 12/167,788, Feb. 3, 2011, 3 pages.
"Final Office Action", U.S. Appl. No. 12/167,788, Oct. 26, 2010, 25 pages.
"Final Office Action", U.S. Appl. No. 12/251,834, Nov. 17, 2011, 7 pages.
"Further Higher Data Rate Extension in the 2.4 GHz Band", IEEE P802.11g/D8.2,Draft Supplement to Standard [for] Information Technology, Apr. 2003, 69 pages.
Heath Jr., et al.,"Limited Feedback Unitary Precoding for Spatial Multiplexing Systems", IEEE Transactions on Information Theory, vol. 51, No. 8,XP011136349, ISSN: 0018-9448 the whole document, Aug. 2005, pp. 2967-2976.
Zhang, et al.,"Method and Apparatus for Transmit Beamforming", U.S. Appl. No. 12/059,846, 62 pages.
"Non-Final Office Action", U.S. Appl. No. 12/251,834, Jun. 21, 2011, 13 pages.
"Non-Final Office Action", U.S. Appl. No. 13/539,131, Jun. 10, 2013, 15 pages.
"Non-Final Office Action", U.S. Appl. No. 13/204,966, Sep. 20, 2012, 17 pages.
"Non-Final Office Action", U.S. Appl. No. 12/167,788, Mar. 30, 2010, 20 pages.
"Non-Final Office Action", U.S. Appl. No. 12/755,246, Sep. 25, 2012, 24 pages.
"Notice of Allowance", U.S. Appl. No. 12/755,246, Jan. 30, 2013, 7 pages.
"Notice of Allowance", U.S. Appl. No. 13/204,966, Feb. 26, 2013, 7 pages.
"Notice of Allowance", U.S. Appl. No. 12/251,834, Mar. 14, 2012, 7 pages.
"Notice of Allowance", U.S. Appl. No. 12/167,788, Mar. 21, 2011, 7 pages.
"Part 11: Wireless LAN Medium Access Control (MAC) and Physical Layer (PHY) specifications", IEEE Std 802.11b-1999/Cor 1-2001,Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999,High-speed Physical Layer in the 5 GHz Band, 1999, 91 pages.
"Partial International Search", Application Serial No. PCT/US2008/011805, May 8, 2009, 6 pages.
"PCT Search Report", Application No. PCT/US2008/011805, Jan. 7, 2009, 25 pages.
"Preliminary Report on Patentability and Written Opinion", Application No. PCT/US2008/011805, Apr. 29, 2010, 9 pages.
"Restriction Requirement", U.S. Appl. No. 12/251,834, Mar. 8, 2011, 7 pages.
"Supplemental Notice of Allowance", U.S. Appl. No. 12/755,246, Feb. 14, 2013, 4 pages.
Mujtaba, "TGn Sync Proposal Technical Specification", IEEE 802.11-04/0889r6,This document presents the technical specification for the MAC and the PHY layer of the TGn Sync proposal to IEEE 802.11 TGn, May 18, 2005, pp. 1-131.
"Notice of Allowance", U.S. Appl. No. 13/539,131, Sep. 30, 2013, 7 pages.
"Corrected Notice of Allowance", U.S. Appl. No. 14/171,269, Jun. 16, 2015, 2 pages.
"Notice of Allowance", U.S. Appl. No. 14/171,269, Mar. 2, 2015, 6 pages.
"Non-Final Office Action", U.S. Appl. No. 14/797,740, Feb. 1, 2016, 4 pages.

\* cited by examiner

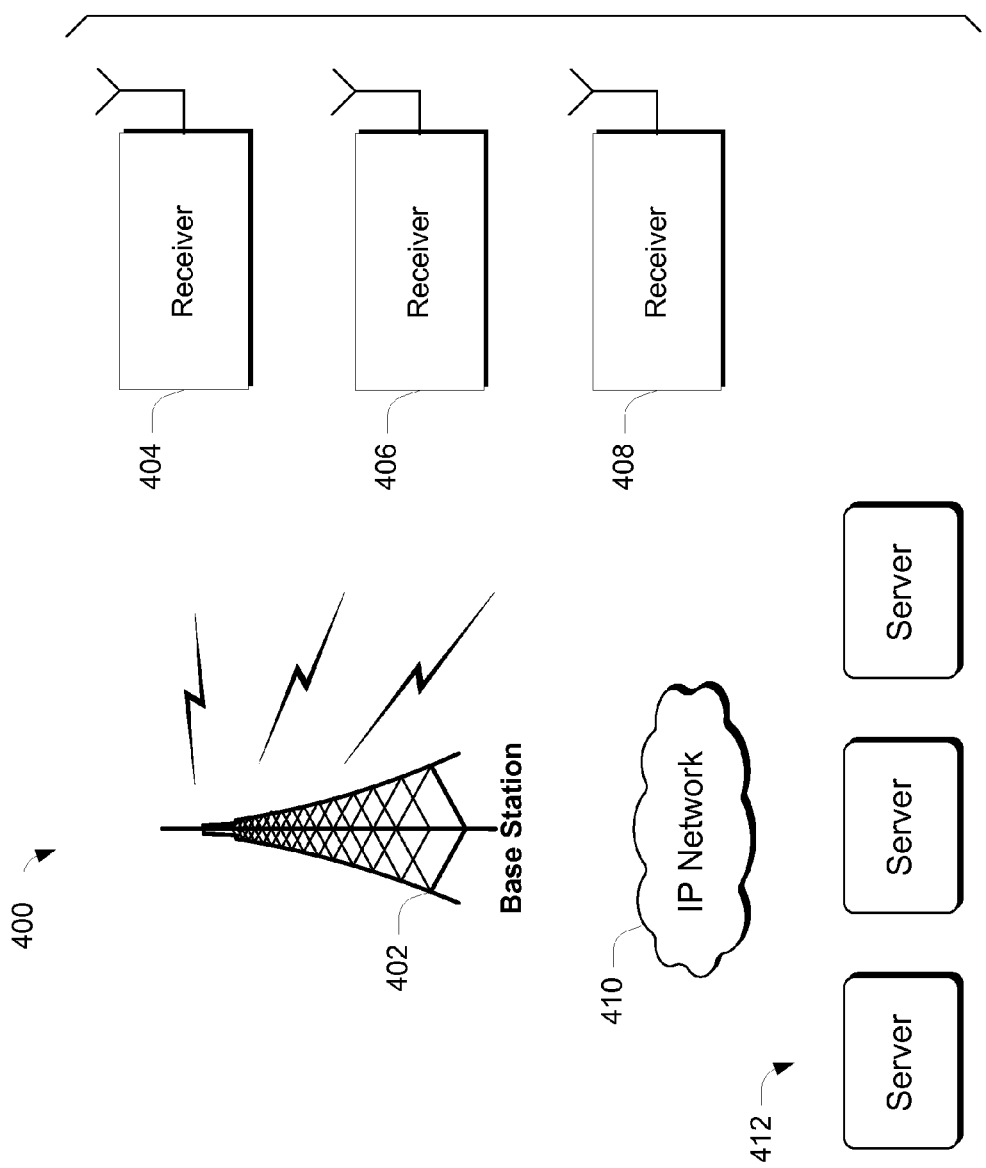

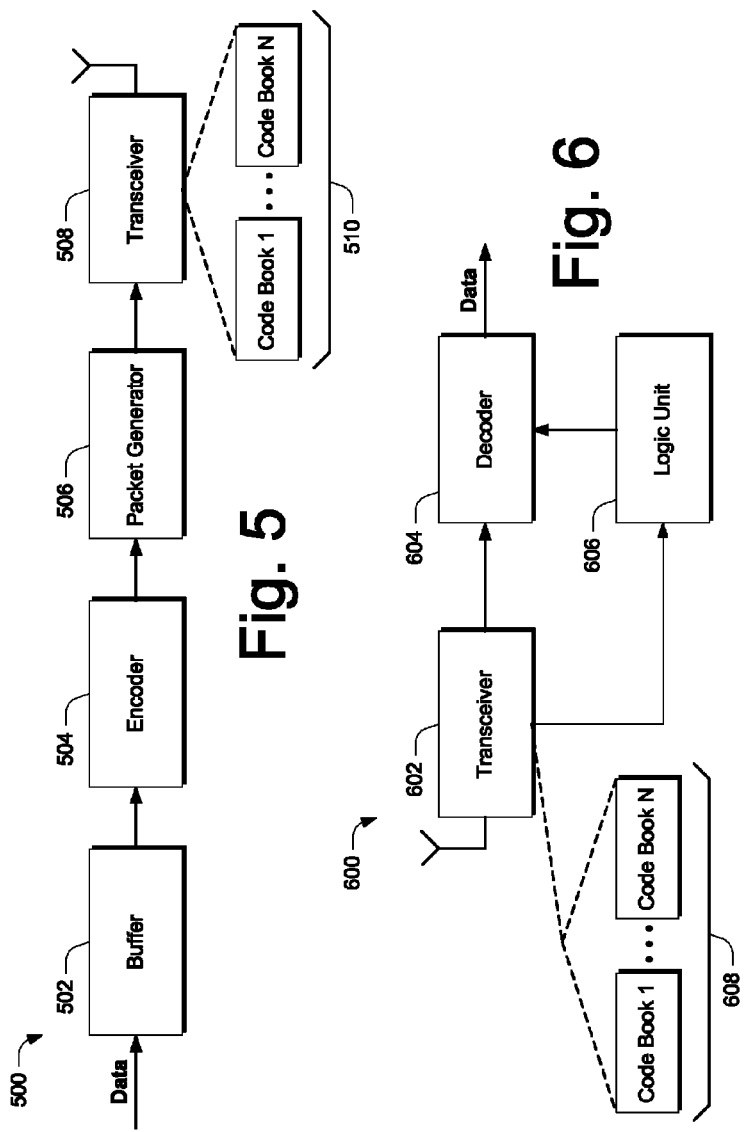

From Fig. 13

METHOD AND APPARATUS FOR USING MULTIPLE CODEBOOKS FOR WIRELESS TRANSMISSION TO A PLURALITY OF USERS IN A CELL

RELATED APPLICATIONS

The present disclosure is a continuation of U.S. patent application Ser. No. 12/755,246, filed Apr. 6, 2010, now U.S. Pat. No. 8,462,716 which in turn claims priority and incorporates by reference U.S. Provisional Application Ser. No. 61/167,714, filed Apr. 8, 2009 and is a continuation in part of and claims priority to U.S. patent application Ser. No. 12/167,788, filed Jul. 3, 2008, now U.S. Pat. No. 7,995,528, incorporated herein by reference in its entirety, which claims priority from and incorporates by reference U.S. Provisional Application Ser. No. 60/950,453 filed on Jul. 18, 2007 and is also a continuation in part of U.S. patent application Ser. No. 12/170,649, filed Jul. 10, 2008, now U.S. Pat. No. 8,125,884 incorporated herein by reference in its entirety, which claims priority from and incorporates by reference U.S. Provisional Application Ser. No. 60/949,134 filed on Jul. 11, 2007.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Beamforming is a commonly used technique in the downlink of advanced cellular systems such as 3G Long-Term Evolution (3G LTE) and Worldwide Interoperability for Microwave Access (WiMAX) systems. Beamforming uses coordinated transmissions across multiple transmit antennas at a base-station in order to direct a signal towards the intended receiver, typically a mobile receiver. The use of beamforming with a narrow beam helps to ensure that the signal strength at the mobile receiver is high, while at the same time ensures that interference caused to receivers at other locations within a particular cell is kept to a minimum.

Setting the coefficients of a beamformer requires channel knowledge at the base station. Specifically, the channel is measured at the receiver and measurements are fed back to the base station over the uplink. Feeding back the entire channel measurement typically requires too much overhead, so in practical systems the receiver generally measures the downlink channel and then selects a beamforming or 'precoding' vector p from a finite set of precoding vectors $\psi = \{p_1, \ldots, p_N\}$ known as a codebook. This codebook is typically designed offline and is known to both the base station and the receiver. As a result the receiver only needs to feed back the index of the selected precoding vector, thus significantly reducing feedback overhead.

Consider, as shown in FIG. 1, a cell with two receivers, Receiver a and Receiver b and an associated base station. The channel row vector from the base station to Receiver a is denoted as $h_a$, where the nth element contains the channel from the nth transmit antenna at the base station to the receiver's antenna. Note that in general there may be multiple antennas at the mobile receiver in which case $h_a$ and $p_a$ will be matrices. Similarly, denote $h_b$ as the channel row vector from the base station to Receiver b. If precoding is applied, the signal transmitted by the base station will be as follows:

$$x = p_a x_a + p_b x_b,$$

where $p_a$ and $P_b$ denote the precoding column vectors of Receivers a and b, and $x_a$ and $x_b$ denote the signals intended for Receivers a and b respectively. The signal received by Receiver a is then as follows:

$$y_a = h_a p_a x_a + h_a p_b x_b + z_a$$

which leads to a signal to interference plus noise ratio (SINR) as follows:

$$SINR_a = \frac{|h_a p_a|^2 S_x}{|h_a p_b|^2 S_x + S_z},$$

Ideally one would like to choose the precoding vector for Receiver a, $p_a$ to be parallel to $h_a$ so that the signal power at Receiver a is maximized. At the same time, one would like $p_a$ to be orthogonal to $h_b$ such that the interference caused to Receiver b is minimized.

Unfortunately, when Receivers a and b are in close vicinity to one another, $h_a \approx h_b$ and it becomes difficult to find a precoding vector that satisfies both criteria. Seen another way, the codebook which contains the set of available precoding vectors may not have a fine enough granularity in angular space to allow the signals intended for the two receivers to be adequately separated. For example, consider transmission with a 4 element (2-bit) codebook as shown in FIG. 2.

In this case one can either transmit to Receiver a using $p_1$, which will cause severe interference to Receiver b, or transmit to Receiver a using $p_2$, which will decrease the interference to Receiver b, but will also cause Receiver a to receive an extremely weak signal since it is located far outside of the main lobe of $p_2$.

One solution to this problem is to increase the codebook size, as diagrammatically indicated in FIG. 3, thereby increasing the number of beams and achieving a finer granularity in angular space. This allows the receivers to be adequately separated, but unfortunately this approach requires a higher feedback overhead and increases the complexity of precoding vector selection at the receiver.

SUMMARY

This Summary is provided to introduce subject matter that is further described below in the Detailed Description and Drawings. Accordingly, the Summary should not be considered to describe essential features nor used to limit the scope of the claimed subject matter.

In one embodiment, a system comprises a base station configured to wirelessly communicate data to users in a cell associated with the base station and allocate different codebooks to each of the users, and computer-readable storage media on which the codebooks are embodied.

In another embodiment, a method comprises receiving, from a receiver within a cell in which a base station wirelessly communicates, first low-bit feedback indicating a first beam of a low-resolution codebook, determining, based on the first beam indicated in the first low-bit feedback, a medium-resolution codebook providing greater resolution in a direction of the first beam, communicating with the receiver according to the medium-resolution codebook, receiving, from the receiver, second low-bit feedback indicating a second beam of the medium-resolution codebook, determining, based on the second beam indicated in the second low-bit feedback, a high-resolution codebook providing greater resolution in a direction of the second beam, and communicating with the receiver according to the high-resolution codebook.

In still another embodiment, a second method comprises receiving first communications from a base station according to a low-resolution codebook and at a receiver, selecting a first beam of the low-resolution codebook, transmitting, to the base station, first low-bit feedback indicating the first beam, receiving second communications from the base station according to a medium-resolution codebook and at the receiver, the medium-resolution codebook providing greater resolution in the direction of the first beam, selecting a second beam of the medium-resolution codebook, transmitting, to the base station, second low-bit feedback indicating the second beam, and receiving third communications from the base station according to a high-resolution codebook and at the receiver, the high-resolution codebook providing greater resolution in the direction of the second beam.

BRIEF DESCRIPTION OF THE DRAWINGS

The same numbers are used throughout the drawings to reference like features.

FIG. 4 illustrates a system in accordance with one or more embodiments.

FIG. 5 illustrates an example transmitter in accordance with one or more embodiments.

FIG. 6 illustrates an example receiver in accordance with one or more embodiments.

DETAILED DESCRIPTION

Overview

Figure 1:
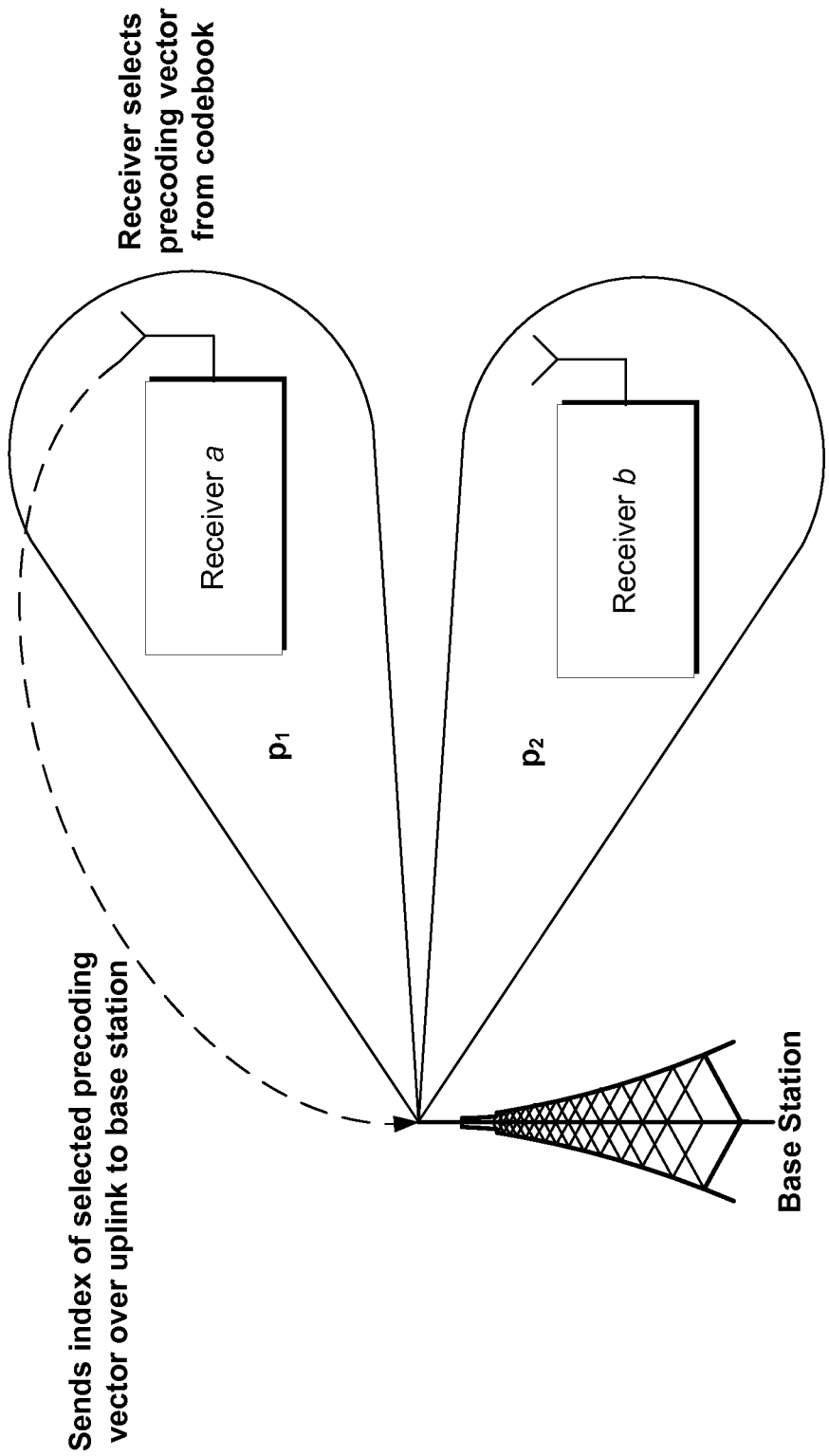
FIG. 1 illustrates a base station and two receivers.
Figure 2:
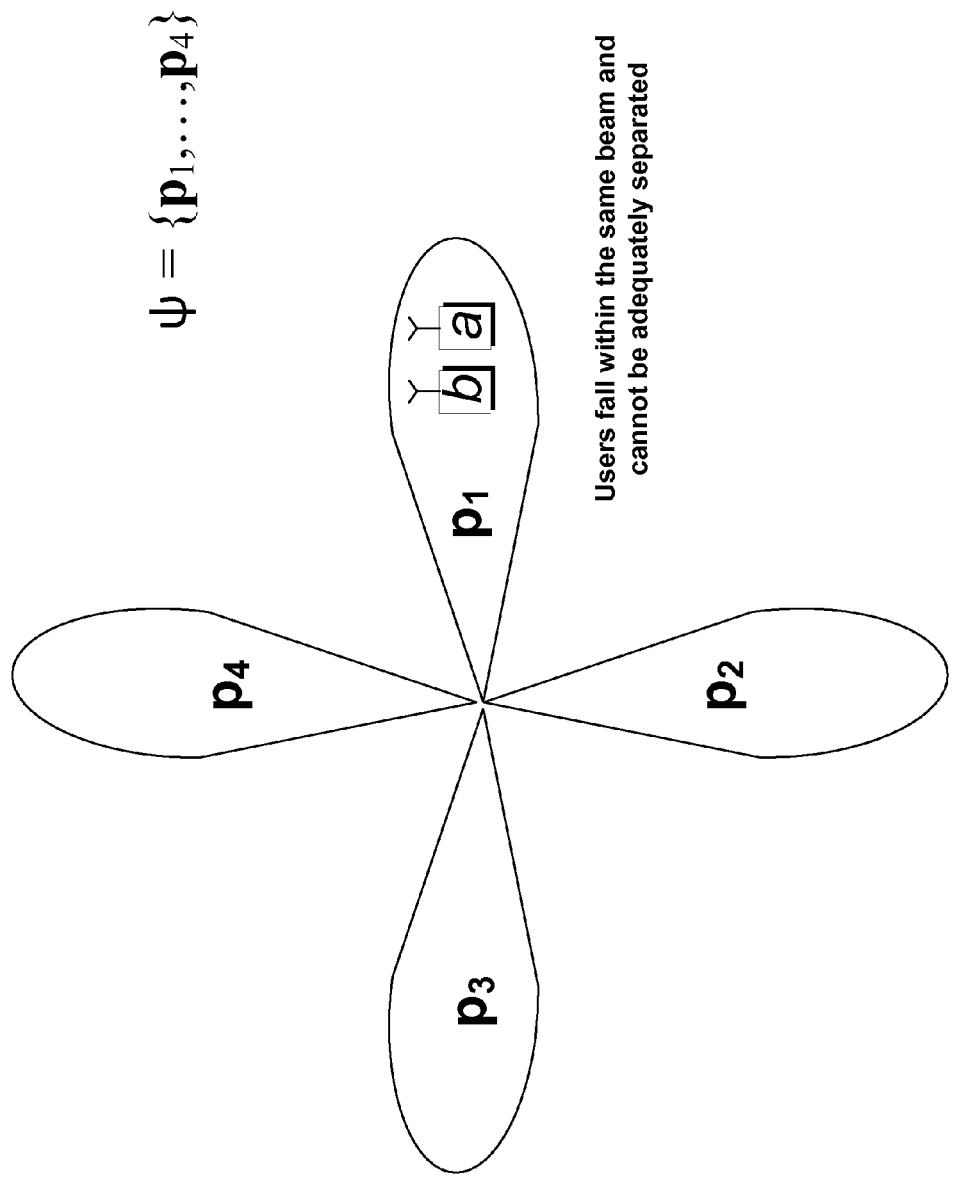
FIG. 2 illustrates transmission with a 4-element codebook.
Figure 3:
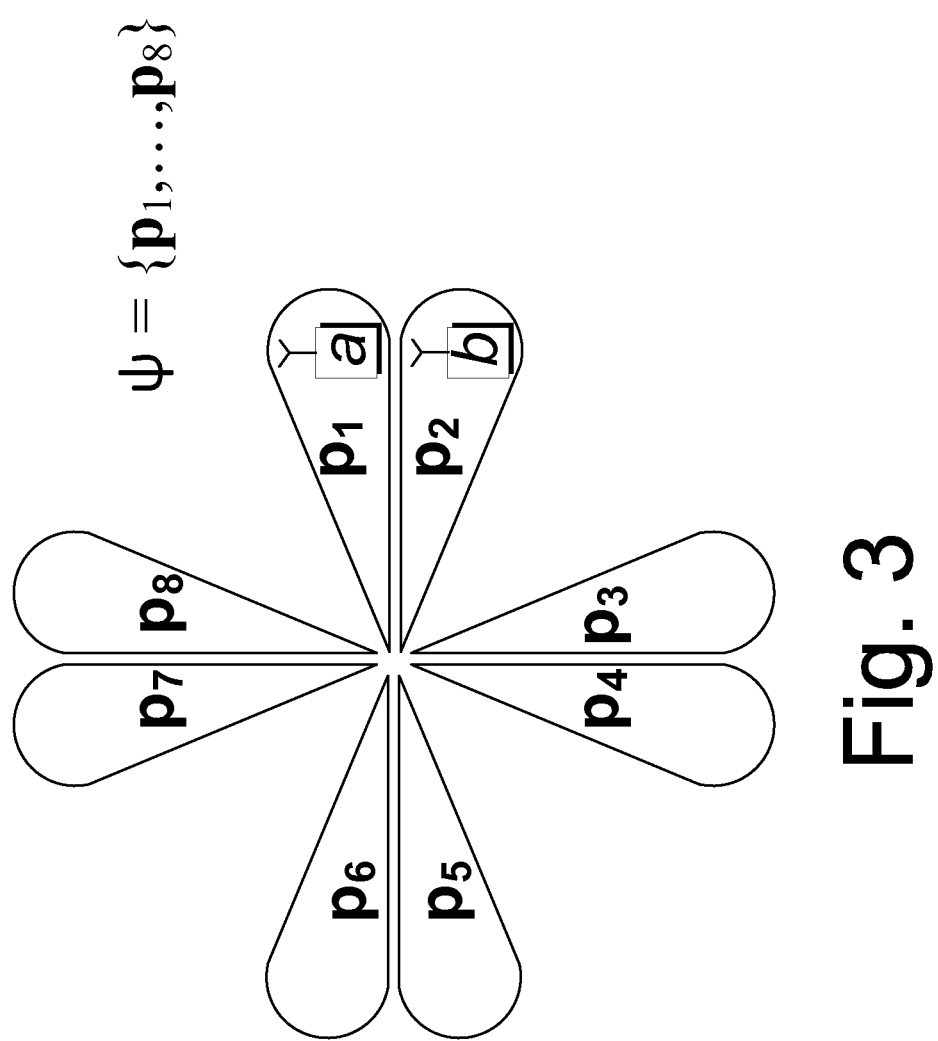
FIG. 3 illustrates transmission, as in FIG. 2, only with a larger codebook.

In one or more embodiments, a cellular system utilizes different codebooks of precoding vectors for different receivers within a particular cell. A set of different codebooks is designed and then used by a base station as a basis to allocate to various receivers in a dynamic fashion. In at least some embodiments, the codebooks are designed to be non-overlapping in angular space. For example, codebooks can be designed to be generally orthogonal to one another thereby increasing the separation between receivers that use the different codebooks.

In at least some embodiments, codebooks can be allocated responsive to a determination that two or more receivers are geographically proximate one another in a manner which would permit an undesirable amount of interference. In yet other embodiments, codebooks can be allocated in a more random fashion.

In the discussion that follows, a section entitled "Operating Environment" is provided and describes one example operating environment in which one or more embodiments can be employed. Following this, a section entitled "Example Transmitter" is provided and gives an example of a transmitter in accordance with one or more embodiments. Next, a section entitled "Example Receiver" is provided and gives an example of a receiver in accordance with one or more embodiments. Following this, a section entitled "Implementation Example" is provided and describes an example implementation in accordance with one or more embodiments. Following this, a section entitled "Example Receiver Environments" is provided and describes various example receiver environments in accordance with one or more embodiments.

Operating Environment

FIG. 4 illustrates a communication system in accordance with one or more embodiments generally at 400. In the illustrated and described embodiments, communication system 400 can work in connection with any suitable wireless or cellular system. By way of example and not limitation, communication system 400 can work in connection with 3G Long-Term Evolution (3G LTE) and/or Worldwide Interoperability for Microwave Access (WIMAX) systems. Typically, such systems include one or more base stations that transmit and receive signals from one or more receivers. In at least some instances, the receivers are mobile receivers that can move within a particular transmission cell. WIMAX is typically used in a number of scenarios including, by way of example and not limitation, Voice over IP or "VoIP", TCP/IP, and with applications having different quality of service or QoS requirements, as will be appreciated by the skilled artisan.

Communication system 400 includes, in this example, one or more base stations 402 and multiple receivers 404, 406, and 408. Base stations can be connected to an IP network 410 via a gateway (not shown). Base station 402 can, and typically does include multiple transmit antennas that are used to effect transmissions to the receivers. The IP network can include various special and general purpose servers shown generally at 412. Elements within both the base stations and receivers are configured with processors, memories, instruction sets and the like, that implement the functionality described in this document. Typically, communication that takes place within the system goes through base station 402. The base station is responsible for allocating bandwidth and can typically handle many receivers. In at least some embodiments, base station 402 is implemented as a WIMAX tower, which is similar in concept to a cell-phone tower. A WIMAX tower can provide coverage to a very large area, e.g., 8000 square kilometers.

Receivers can include, by way of example and not limitation, receivers such as those that are associated with residential and business customers. The receiver and associated antenna(s) can be embodied in a small box or PCMCIA card, or can be embodied in some type of computing device such as a laptop computer, notebook computer, desktop computer, mobile device and/or a handheld computing device to name just a few. Of course, the receiver can be embodied in other types of computing devices without departing from the spirit and scope of the claimed subject matter.

Communication system 400 includes two types of communication links. A downlink is used for communication from the base station 402 to the receivers 404, 406, and 408. An uplink is used for communication from the receivers to base station 402.

Communication system 400 utilizes the base station 402 to communicate data, such as packets and/or other information, to the various receivers. Any suitable data format can be used, as will be appreciated by the skilled artisan. When individual receivers boot up, each can register with the base station. The base station can serve to exchange messages with the receivers located in a corresponding service cell, authenticate and register receivers via one or more servers in the IP network, transmit service request messages from the receivers to the IP network, and transmit packets from the IP network to the receivers, and so on.

As noted above, in one or more embodiments a base station has at its disposal multiple different codebooks that can be allocated to receivers within a particular cell. The codebooks each provide a set of precoding vectors which define coefficients that are utilized to provide a beam pattern. By using the different codebooks, different beam patterns can be defined. The different codebooks can then be assigned or allocated to different receivers within the cell in order to reduce interference between transmitted signals by virtue of using different beam patterns for different receivers.

Example Transmitter

FIG. 5 illustrates a transmitter, such as that embodied at base station 402 (FIG. 4), generally at 500 in accordance with one or more embodiments. In this example, transmitter 500 includes a buffer 502, an encoder 504, a packet generator 506, and a transceiver 508 including one or more antennas. The transceiver 508 includes a set of codebooks 510. Any suitable number of codebooks can be used. The codebooks are typically embodied on some type of computer-readable storage media.

Buffer 502 includes storage media such as random access memory for storing data that is to be transmitted to a receiver, such as one or more receivers (not shown). Buffer 502 is coupled with encoder 504, which is configured to encode the buffer data in any suitable encoding scheme.

Encoder 504 is communicatively coupled with packet generator 506. The packet generator includes circuitry and logic that constructs data packets that are to be transmitted to various receivers. The packet generator is coupled with transceiver 508, which is configured to transmit the data packets to the various receivers, as will be understood by the skilled artisan.

The set of codebooks 510 can be used to allocate individual codes books to individual receivers within a particular cell. The codebooks each provide a set of precoding vectors which define coefficients that are utilized to provide a beam pattern. By using the different codebooks, different beam patterns can be defined. The different codebooks can then be assigned or allocated to different receivers within the cell in order to reduce interference between transmitted signals by virtue of using different beam patterns for different receivers.

Example Receiver

FIG. 6 illustrates a receiver, generally at 600, in accordance with one or more embodiments. The illustrated receiver represents a receiver, such as receivers 404, 406, and 408 in FIG. 4. In this example, receiver 600 includes a transceiver 602, a decoder 604, and a logic unit 606. In addition, the receiver includes or otherwise has access to a set of codebooks 608. Codebook set 608 includes the same codebooks that are included in codebook set 510 (FIG. 5). The codebooks are typically embodied on some type of computer-readable storage media.

In the illustrated and described embodiment, transceiver 602 is one that can operate in compliance with any suitable wireless or cellular standard, such as those named above and others.

Transceiver 602 is configured to receive transmitted packets from a transmitter, such as that shown in FIG. 5. Transceiver 602 is communicatively coupled to decoder 604 and provides received packets to the decoder for decoding in accordance with usual operations which will be understood by the skilled artisan.

Logic unit 606 is configured with a microprocessor controller and logic to facilitate decoding operations. Decoder 604 outputs data that has been decoded.

In operation, the base station can select, from its set of codebooks, a particular codebook for a particular receiver. The base station then notifies the receiver of the particular codebook which is then used for transmissions to and from the receiver. The base station can use any suitable criteria upon which to base its selection of a particular codebook for a particular receiver. For example, in some embodiments, the base station may dynamically assign codebooks to receivers based upon knowledge that the receiver is within an associated cell. Alternately or additionally, the base station may take into account criteria associated with the geographical proximity of receivers. That is, the base station may acquire information that describes the physical locations of the receivers within a particular cell. Using the information, the base station can then make codebook allocations. Some examples of how this can be done are provided just below.

Implementation Example

Figure 7:
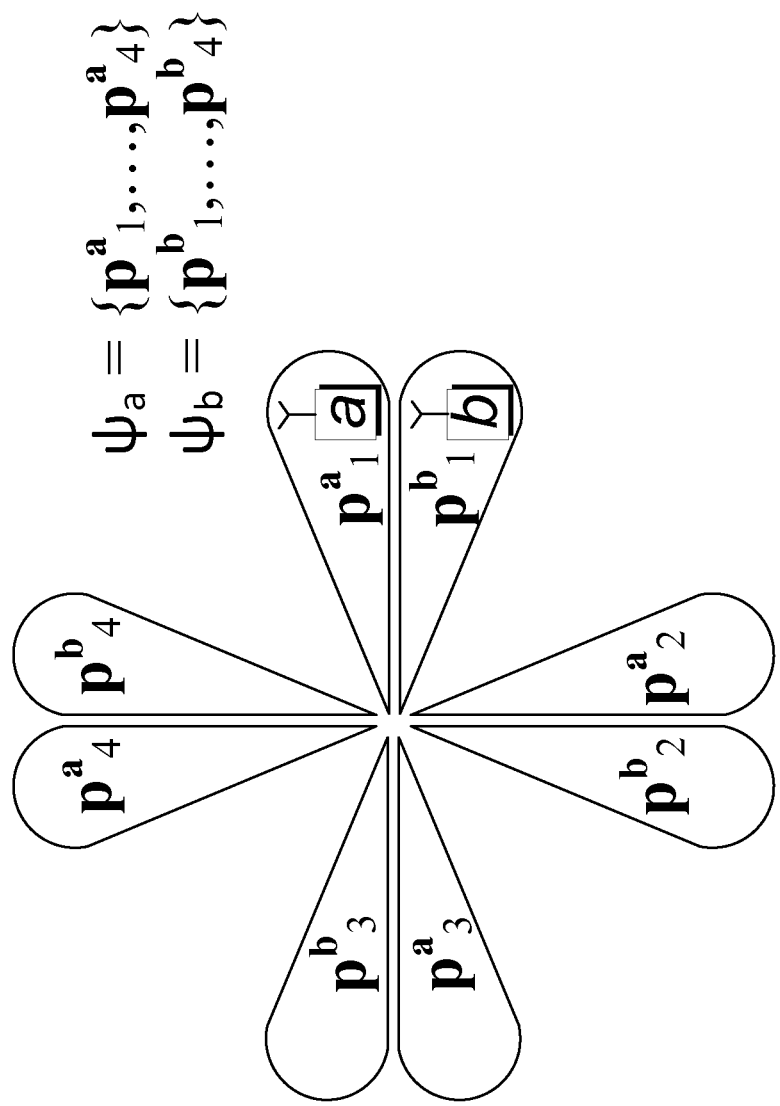
FIG. 7 illustrates transmission using multiple codebooks in accordance with one or more embodiments.

FIG. 7 illustrates a system in accordance with one or more embodiments. Here, two different codebooks are used. The codebooks are represented as follows:

$$\psi_a = \{p^a_1, \ldots p^a_4\}$$

where p represents a beam-forming or precoding vector.

In one or more embodiments, the different codebooks are designed and allocated by the base station to different receivers, such as mobile receivers, in a dynamic fashion. In at least some embodiments, the codebooks are designed to be generally orthogonal or non-overlapping in angular space, thereby increasing the separation between receivers that use the different codebooks. Codebooks can be allocated in any suitable fashion using any suitable method examples of which are described just below.

Figure 8:
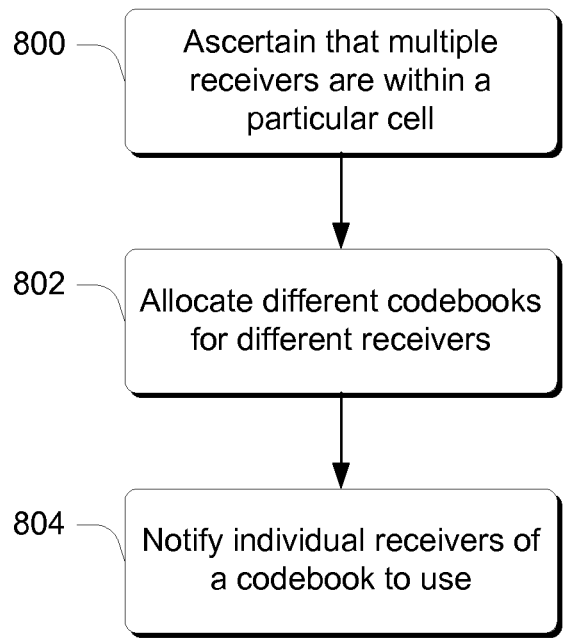
FIG. 8 is a flow diagram that describes acts in a method in accordance with one or more embodiments.

FIG. 8 is a flow diagram that describes a method in accordance with one embodiment. The method can be implemented in connection with any suitable hardware, software, firmware, or combination thereof. In at least some embodiments, the method can be implemented, at least in part, by a base station such as those that are described above.

Act 800 ascertains that multiple receivers are within a particular cell. This act can be performed in any suitable way. For example, a base station can maintain a list of receivers that are located within an associated cell. Act 802 allocates different codebooks for different receivers. This act can be performed by a base station selecting a particular codebook relative to a group of receivers in a manner that is directed to reducing associated interference with transmissions that occur using a codebook. Act 804 notifies individual receivers of a codebook to use. This act can be performed by transmitting an index of an associated codebook to a particular receiver. Once the particular codebook is known to the receiver, transmissions between the base station and an associated receiver can be conducted using the codebook to select particular beam patterns for transmissions.

Figure 9:
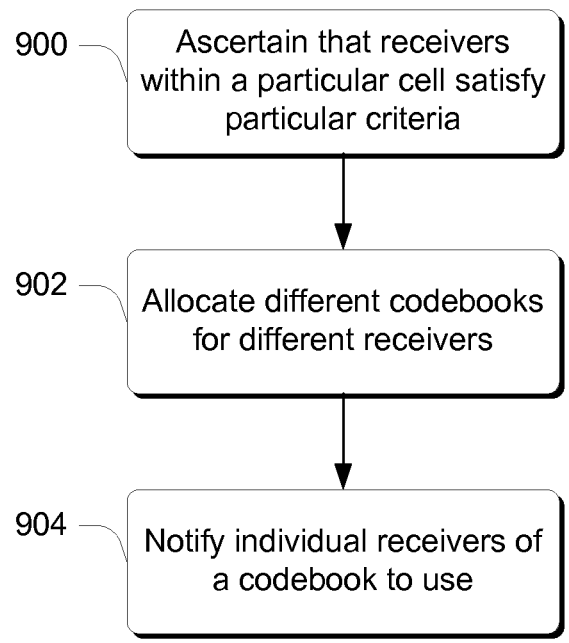
FIG. 9 is a flow diagram that describes acts in a method in accordance with one or more embodiments.

FIG. 9 is a flow diagram that describes a method in accordance with one embodiment. The method can be implemented in connection with any suitable hardware, software, firmware, or combination thereof. In at least some embodiments, the method can be implemented, at least in part, by a base station such as those that are described above.

Act 900 ascertains that receivers within a particular cell satisfy particular criteria. Any suitable criteria can be used.

For example, such criteria can include the geographical proximity of the receivers relative to one another. Any suitable method can be used to ascertain the geographical proximity of the receivers. For example, in at least some embodiments, the base station can detect, using multiple antennas, whether the uplink signals of individual receivers have similar angles of arrival. Alternately or additionally, GPS techniques can be used in cases where receivers are equipped with GPS hardware. If act 900 ascertains that receivers within a particular cell satisfy the particular criteria, act 902 allocates different codebooks for different receivers. This act can be performed by a base station selecting a particular codebook relative to a group of receivers in a manner that is directed to reducing associated interference with transmissions that occur using a codebook. Act 904 notifies individual receivers of a codebook to use. This act can be performed by transmitting an index of an associated codebook to a particular receiver. Once the particular codebook is known to the receiver, transmissions between the base station and an associated receiver can be conducted.

Figure 10:
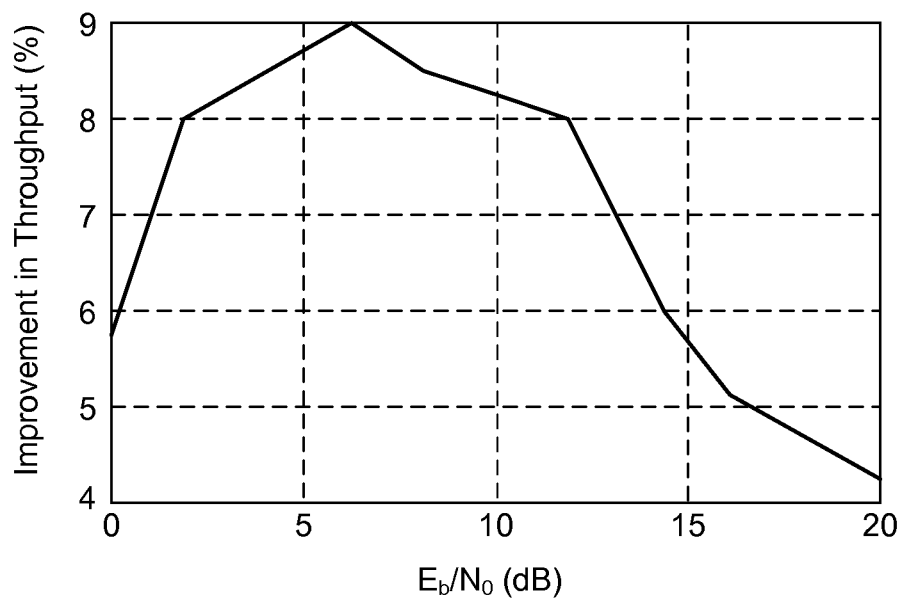
FIG. 10 is a graph that illustrates throughput improvements using multiple codebooks in accordance with one or more embodiments.

FIG. 10 is a graph that shows an example improvement in throughput that can be achieved through the use of precoding using multiple different codebooks. Multi-user MIMO systems with multiple codebooks can reduce interference and increase spatial diversity. This improves throughput because users with less interference can support more aggressive MCSs (modulation and coding schemes) and thus more data can be encoded and transmitted.

Figure 11:
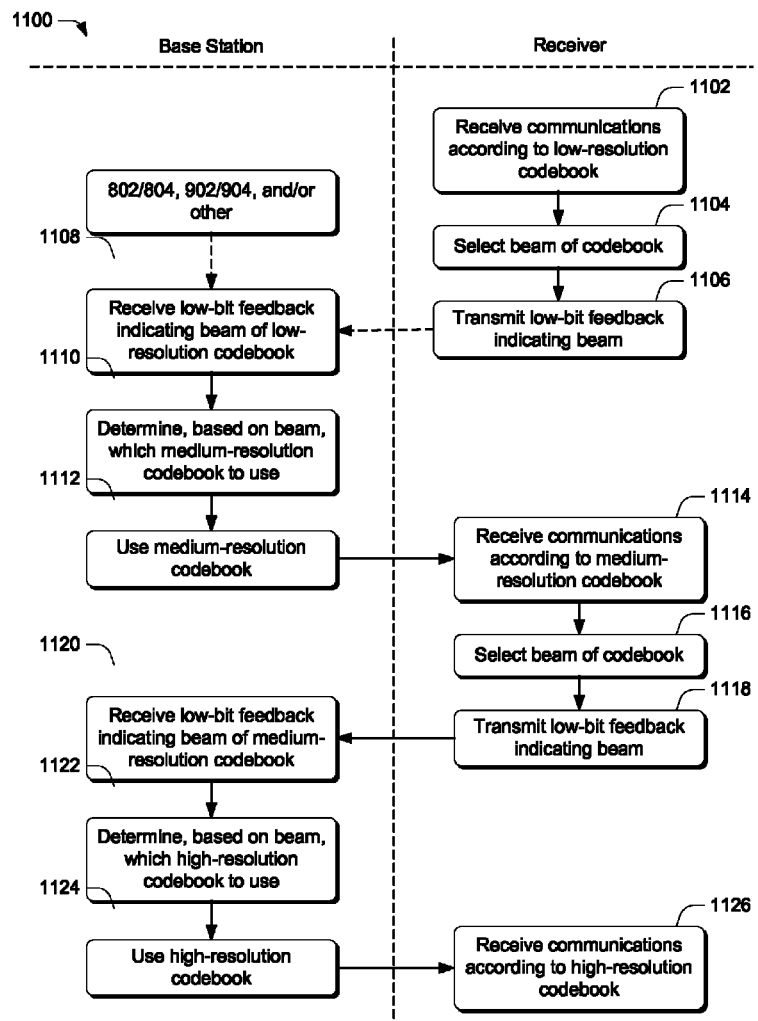
FIG. 11 is a flow diagram that describes a method in accordance with one or more embodiments.

FIG. 11 is a flow diagram that describes a method 1100 in accordance with one or more embodiments. The method can be implemented in connection with any suitable hardware, software, firmware, or combination thereof. In at least some embodiments, the method can be implemented, at least in part, by a base station and/or receiver described herein. Method 1100 may be performed in part and by just a base station or receiver; interactions between the base station and receiver are shown for illustrative purposes and are not intended to limit the method to use by two or more entities.

At 1102, a receiver receives communications from a transmitting entity, such as one of the base stations described herein, and according to a low-resolution codebook. This receiver is within a cell in which the base station is configured to wirelessly communicate. This low-resolution codebook can be selected for use according to various manners set forth elsewhere herein, and may be one of a set of multiple low-resolution codebooks.

Figure 12:
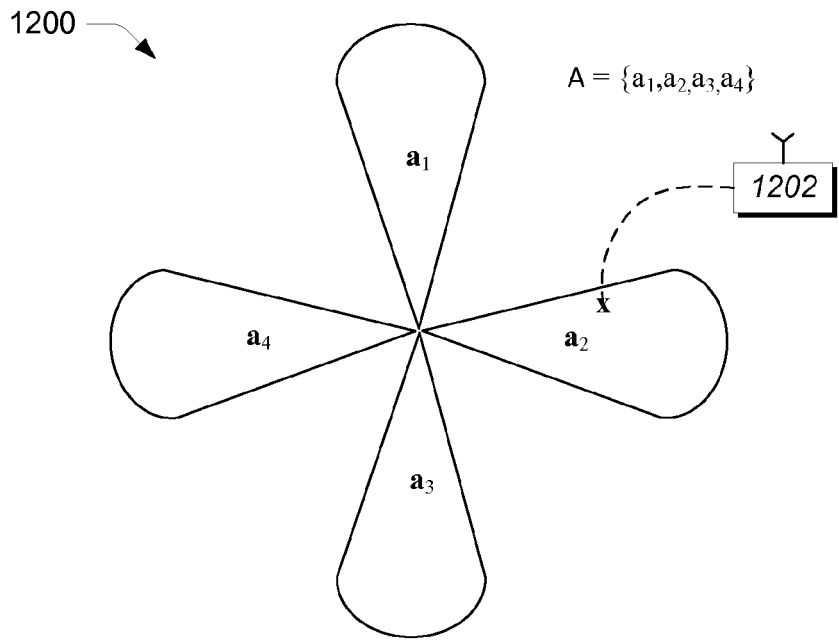
FIGS. 12-15 illustrate transmission using multiple codebooks in accordance with one or more embodiments.

By way of example, consider FIG. 12, which illustrates a low-resolution codebook 1200. Low-resolution codebook 1200 includes four beams and is represented as follows:

$$A=\{a_1,a_2,a_3,a_4\}$$

where a represents a beam-forming or precoding vector (a "beam"). Note that low-resolution codebook 1200 can be one example of the codebook illustrated at FIG. 7, though this is not required.

At 1104, the receiver selects a beam of the low-resolution codebook. The receiver selects the beam from the available beams of the low-resolution codebook based on it being the closest of the beams, having the highest reliability of the beams, and/or having the greatest throughput of the beams. Manners in which the receiver may do so are set forth in greater detail elsewhere herein. This is illustrated in FIG. 12, which shows receiver 1202 as having selected beam $a_2$.

At 1106, the receiver transmits low-bit feedback indicating the selected beam, which in this case is beam $a_2$.

At 1108, the base station receives low-bit feedback indicating the selected beam of the low-resolution codebook. An example of such a base station is base station 402 illustrated in FIG. 4 (not shown in FIG. 12). The low-bit feedback can include as few as a single bit indicating which of two beams of a low-resolution codebook in which the receiver determines to have the closest pre-coding vector. In the ongoing example each codebook includes four beams and each feedback as few as two bits. Act 1108, as noted by dashed lines to act 1108, may occur following acts 802 or 804 shown in FIG. 8, 902 or 904 shown in FIG. 9, act 1106, or other actions.

At 1110, the base station determines, based on the beam indicated by the receiver, which medium-resolution codebook to use. While the codebooks discussed as part of FIGS. 11-15 are described as low, medium, and high resolution, these are relative terms indicating a progression of higher-resolution codebooks. This does not necessarily indicate, however, that a codebook has more beams than another codebook. In the ongoing example, all three of the codebooks are represented with four beams (also called elements elsewhere herein), thereby permitting low-bit feedback by a receiver to indicate which beam is selected.

The base station may determine which medium-resolution codebook to use based on the direction of the indicated beam. This relatively finer resolution codebook covers the direction indicated by the beam at higher resolution, as illustrated by medium-resolution codebook 1300 at FIG. 13. Following this determination, the base station communicates, at 1112, using the determined medium-resolution codebook.

Figure 13:
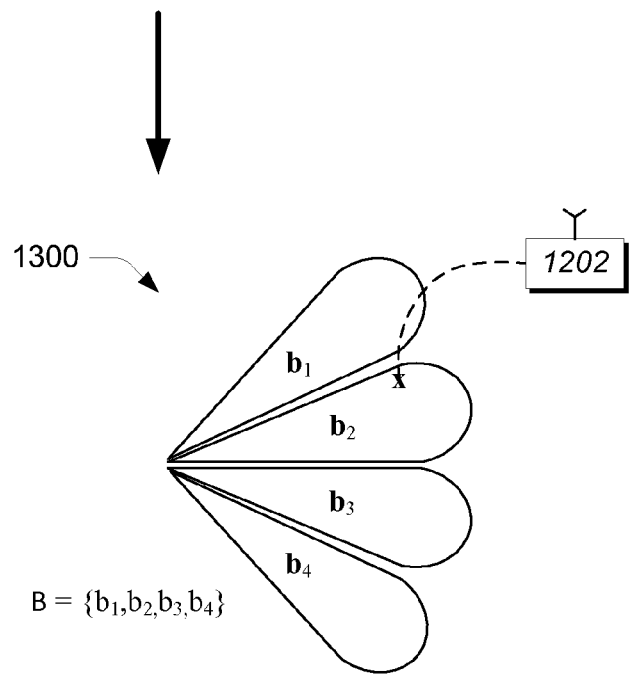

Medium-resolution codebook 1300 includes four beams directed to the beam indicated by receiver 1202. Note that three other medium-resolution codebooks could have been used instead, had receiver 1202 indicated one of the other three beams. Medium-resolution codebook 1300 includes four beams and is represented as follows:

$$B=\{b_1,b_2,b_3,b_4\}$$

where b represents a beam-forming or precoding vector (here called a "beam"). FIG. 13 also illustrates receiver 1202, though in this case having selected beam $b_2$.

At 1114 the receiver receives communications from the base station according to the medium-resolution codebook. At 1116, the receiver selects a beam of the medium-resolution codebook similarly to the manner set forth at 1104, in this case beam $b_2$. At 1118, the receiver transmits low-bit feedback indicating a beam selected from the medium-resolution codebook, here with as few as two bits.

At 1120, the base station receives the low-bit feedback from the receiver, which indicates which beam of the medium-resolution codebook is selected by the receiver.

Figure 14:
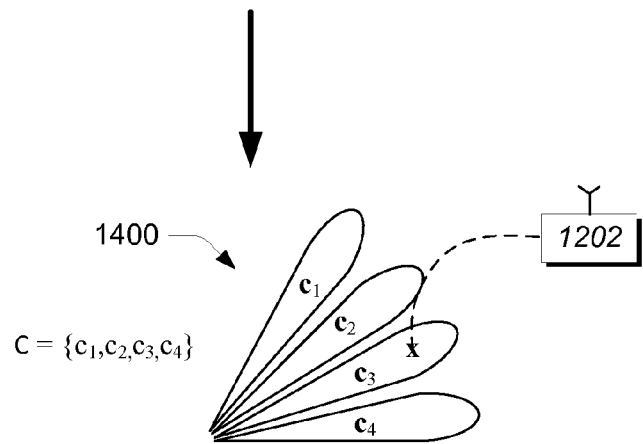
Figure 15:
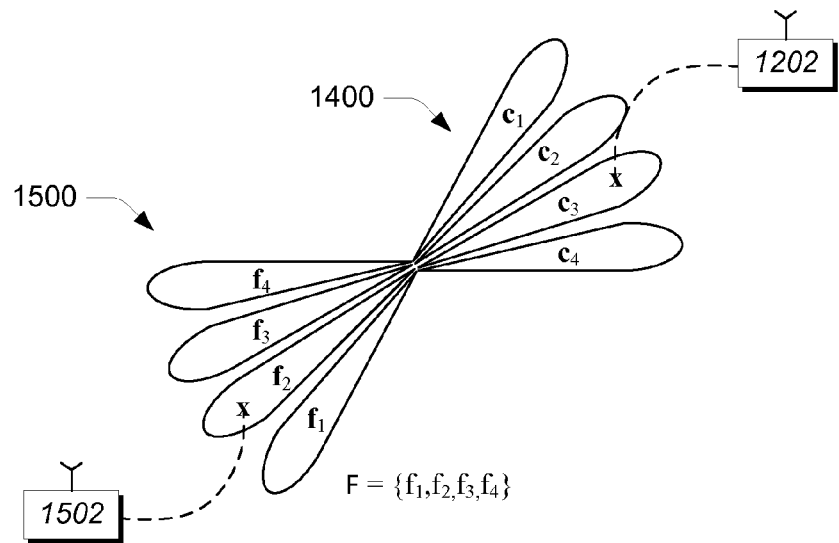

At 1122, the base station determines which high-resolution codebook to use based on the direction of the indicated beam. At 1124 the base station uses that high-resolution codebook. An example of a determined high-resolution codebook is shown at 1400, which includes four beams and is represented as follows:

$$C=\{c_1,c_2,c_3,c_4\}$$

where c represents a beam-forming or precoding vector (a "beam"). FIG. 14 illustrates receiver 1202, here having selected beam $c_3$.

At 1126 the receiver receives communications according to the high-resolution codebook. The receiver may indicate which of the beams it selects, here beam $c_3$ (indication not shown). This method may continue through progressively higher resolution codebooks though these are not illustrated here for brevity. As is visually apparent at FIG. 14, receiver 1202 is now communicating through a high-resolution beam (beam $c_3$) while only transmitting feedback with as little as two bits. This high-resolution beam often provides for better reliability and throughput between receiver 1202 and the base station.

Each of these codebooks can be viewed as part of a family of codebooks, each of the family of codebooks selected through various manners described elsewhere herein.

The example illustrated at FIGS. 12-14 concerns a single receiver, though multiple receivers may also benefit from method 1100. This is illustrated in part at FIG. 15, which shows a receiver 1502 having selected beam $f_2$ according to method 1100. In this example the base station transmits and receives using different frequency resources for each of receiver 1202 and receiver 1502. Here a second high-resolution codebook 1500 includes four beams and is represented as follows:

$$F=\{f_1, f_2, f_3, f_4\}$$

where f represents a beam. High-resolution codebook 1500 is part of the same family of codebooks as 1400, 1300, and 1200. Continuity of codebook families, however, is not required.

Example Receiver Environments

Referring now to FIGS. 16-19, various example implementations of receiver environments are shown. The various receiver environments can utilize the techniques described above.

Figure 16:
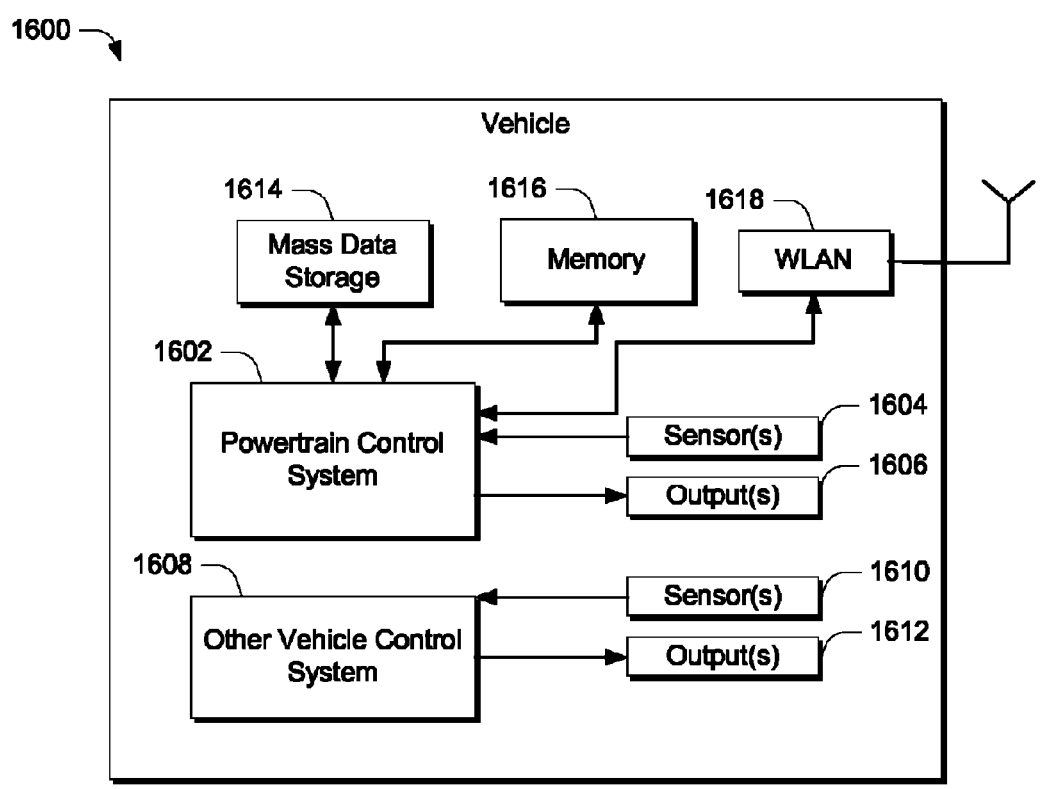
FIGS. 16-19 illustrate example receivers in accordance with one or more embodiments.

Referring now to FIG. 16, a receiver may be implemented as part of a communication system of a vehicle 1600, a WLAN interface 1618 and/or mass data storage 1614 of the vehicle control system. In some implementations, a powertrain control system 1602 receives inputs from one or more sensors 1604 such as temperature sensors, pressure sensors, rotational sensors, airflow sensors, and/or any other suitable sensors that generate one or more output control signals 1606, such as engine operating parameters, transmission operating parameters, and/or other control signals.

A receiver can be embodied in other control systems 1608 of vehicle 1600. Control system 1608 may likewise receive signals from input sensors 1610 and/or output control signals 1612 to one or more output devices. In some implementations, control system 1608 may be part of an anti-lock braking system (ABS), a navigation system, a telematics system, a vehicle telematics system, a lane departure system, an adaptive cruise control system, a vehicle entertainment system such as a stereo, DVD, compact disc, and the like. Still other implementations are contemplated.

Powertrain control system 1602 may include mass data storage 1614 that stores data in a nonvolatile manner. Mass data storage 1614 may include optical and/or magnetic storage devices for example hard disk drives HDD and/or DVDs. The magnetic storage device may be a mini HDD that includes one or more platters having a diameter that is smaller than approximately 1.8". Powertrain control system 1602 may be connected to memory 1616 such as RAM, ROM, low latency nonvolatile memory such as flash memory, and/or other suitable electronic data storage. Powertrain control system 1602 also may support connections with a WLAN via a WLAN network interface 1618. The control system 1608 may also include mass data storage, memory, and/or a WLAN interface (all not shown).

Figure 17:
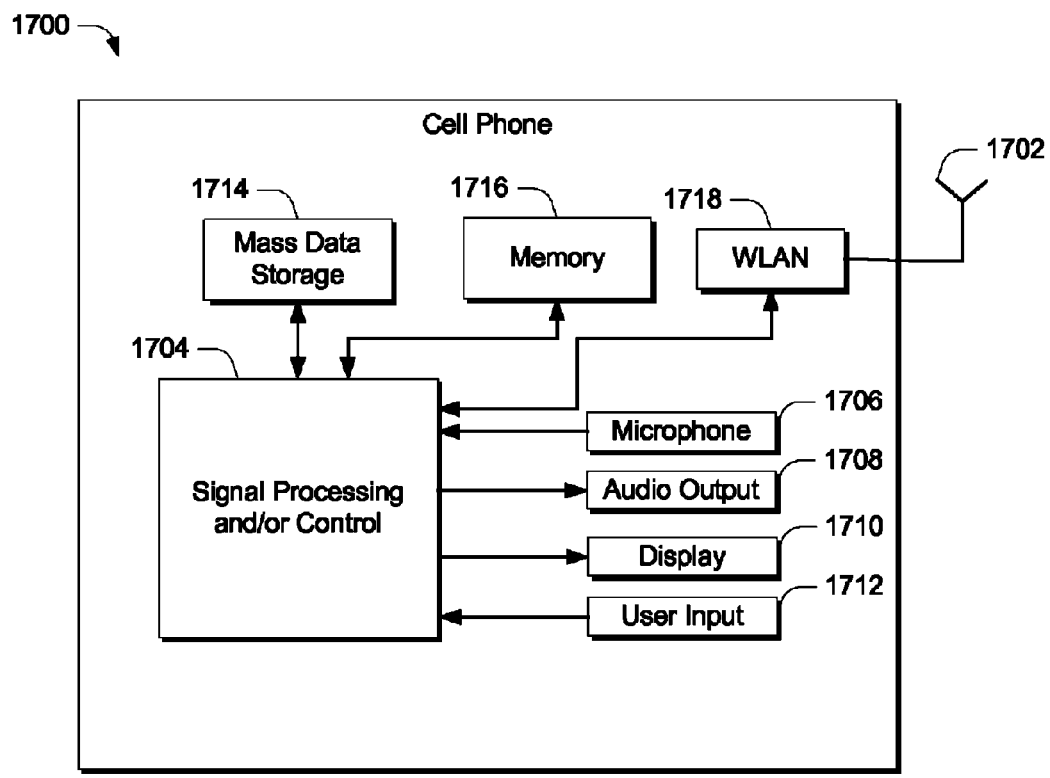

Referring now to FIG. 17, the receiver may be embodied in a cellular phone 1700 that may include a cellular antenna 1702. The receiver may be implemented in connection with either or both signal processing and/or control circuits, which are generally identified in at 1704, a WLAN interface 1718, and/or mass data storage of the cellular phone 1700. In some implementations, cellular phone 1700 includes a microphone 1706, an audio output 1708 such as a speaker and/or audio output jack, a display 1710 and/or an input device 1712 such as a keypad, pointing device, voice actuation, and/or other input device. Signal processing and/or control circuits 1704 and/or other circuits (not shown) in cellular phone 1700 may process data, perform coding, decoding and/or encryption, perform calculations, format data, and/or perform other cellular phone functions.

Cellular phone 1700 may include mass data storage 1714, which stores data in a nonvolatile manner such as optical and/or magnetic storage devices for example hard disk drives HDD and/or DVDs. The magnetic storage device may be a mini HDD that includes one or more platters having a diameter that is smaller than approximately 1.8". Cellular phone 1700 may be connected to memory 1716 such as RAM, ROM, low latency nonvolatile memory such as flash memory, and/or other suitable electronic data storage. Cellular phone 1700 also may support connections with a WLAN via a WLAN network interface 1718.

Figure 18:
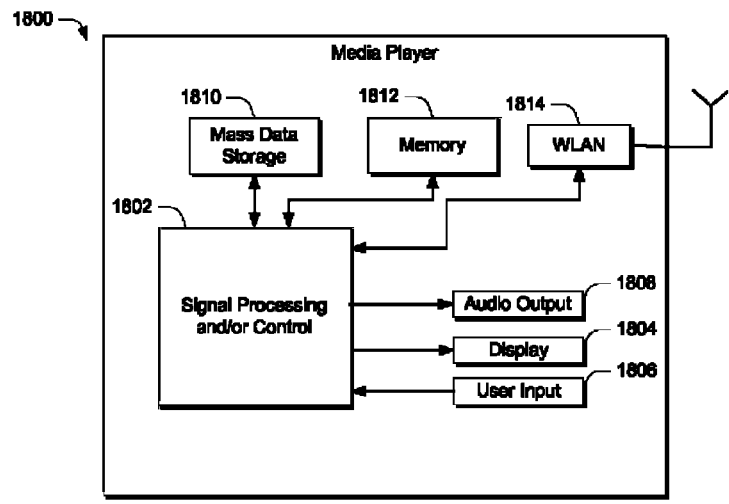

Referring now to FIG. 18, a receiver may be embodied in a media player 1800 and may be implemented in connection with either or both signal processing and/or control circuits, which are generally identified at 1802, a WLAN interface 1814, and/or mass data storage 1810 of the media player 1800. In some implementations, media player 1800 includes a display 1804 and/or a user input 1806 such as a keypad, touchpad, and the like. In some implementations, media player 1800 may employ a graphical user interface (GUI) that typically employs menus, drop down menus, icons, and/or a point-and-click interface via display 1804 and/or user input 1806. Media player 1800 further includes an audio output 1808 such as a speaker and/or audio output jack. Signal processing and/or control circuits 1802 and/or other circuits (not shown) of media player 1800 may process data, perform coding, decoding and/or encryption, perform calculations, format data, and/or perform any other media player function.

Media player 1800 may include mass data storage 1810 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The magnetic storage device may be a mini HDD that includes one or more platters having a diameter that is smaller than approximately 1.8". Media player 1800 may be connected to memory 1812 such as RAM, ROM, low latency nonvolatile memory such as flash memory, and/or other suitable electronic data storage. Media player 1800 also may support connections with a WLAN via a WLAN network interface 1814.

Figure 19:
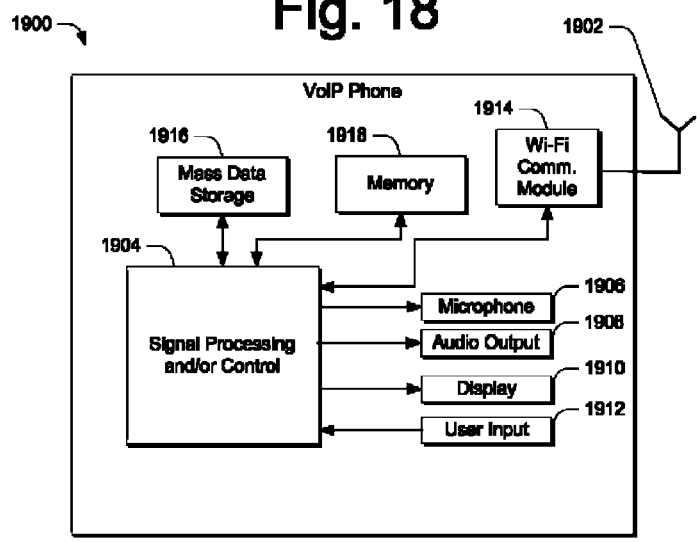

Referring to FIG. 19, a receiver may be embodied in connection with a Voice over Internet Protocol (VoIP) phone 1900 that may include an antenna 1902 or, alternately or additionally, in connection with a VoIP box that enables a conventional telephone to be plugged in and utilized with VoIP technology. The receiver may be implemented in connection with either or both signal processing and/or control circuits, which are generally identified at 1904, a wireless interface 1914, and/or mass data storage 1916 of the VoIP phone 1900. In some implementations, VoIP phone 1900 includes, in part, a microphone 1906, an audio output 1908 such as a speaker and/or audio output jack, a display monitor 1910, an input device 1912 such as a keypad, pointing device, voice actuation, and/or other input devices, and a Wireless Fidelity (Wi-Fi) communication module 1914. Signal processing and/or control circuits 1904 and/or other circuits (not shown) in VoIP phone 1900 may process data, perform coding, decoding and/or encryption, perform calculations, format data, and/or perform other VoIP phone functions.

VoIP phone 1900 may include mass data storage 1916 that stores data in a nonvolatile manner such as optical and/or magnetic storage devices, for example hard disk drives HDD and/or DVDs. The magnetic storage device may be a mini HDD that includes one or more platters having a diameter that is smaller than approximately 1.8". VoIP phone 1900 may be connected to memory 1918, which may be a RAM, ROM, low latency nonvolatile memory such as flash memory, and/or other suitable electronic data storage. VoIP phone 1900 is configured to establish communications link with a VoIP network (not shown) via Wi-Fi communication module 1914. Still other implementations in addition to those described above are contemplated.

Conclusion

In one or more embodiments, a cellular system utilizes different codebooks of precoding vectors for different receivers within a particular cell. A set of different codebooks is designed and then used by a base station as a basis to allocate to various receivers in a dynamic fashion. In at least some embodiments, the codebooks are designed to be non-overlapping in angular space. For example, codebooks can be designed to be generally orthogonal to one another thereby increasing the separation between receivers that use the different codebooks.

In at least some embodiments, codebooks can be allocated responsive to a determination that two or more receivers are geographically proximate one another in a manner which would permit an undesirable amount of interference. In yet other embodiments, codebooks can be allocated in a more random fashion.

In at least some embodiments, the approach outlined above can ensure that codebooks of the individual receivers do not increase in size, which allows performance to be improved without the need for additional feedback or higher complexity during precoder selection.

In at least some embodiments, one or more of the approaches outlined above can permit progressively higher-resolution codebooks and corresponding beams using low-bit feedback from a receiver.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A base station configured to wirelessly communicate data to a plurality of users in a cell associated with the base station, the base station comprising:
    a transceiver in communication with the plurality of users in the cell associated with the base station, wherein the transceiver includes a plurality of codebooks, wherein each codebook of the plurality of codebooks defines a set of beam patterns in angular space, and wherein
        (i) a first codebook of the plurality of codebooks defines a first set of beam patterns having a first granularity in angular space, and
        (ii) a second codebook of the plurality of codebooks defines a second set of beam patterns having a second granularity in angular space, wherein the second granularity is finer relative to the first granularity,
    wherein the transceiver is configured to allocate the first codebook to a first user of the plurality of users in the cell, and allocate the second codebook to a second user of the plurality of users in the cell, the allocation of the first codebook to the first user and the second codebook to the second user based on geographic criteria indicating allocation of a same codebook to the first user and the second user would cause interference in wireless data communication, and
    wherein the transceiver is further configured to
        (i) communicate data to the first user in accordance with one or more of the first set of beam patterns defined by the first codebook, and
        (ii) communicate data, at a same time as the communication to the first user, to the second user in accordance with one or more of the second set of beam patterns defined by the second codebook.

2. The base station of claim 1, wherein:
    the first codebook comprises a first set of precoding vectors that respectively correspond with the first set of beam patterns, and
    the second codebook comprises a second set of precoding vectors that respectively correspond with the second set of beam patterns.

3. The base station of claim 1, wherein the plurality of users in the cell are mobile receivers capable of receiving data wirelessly communicated by the base station.

4. The base station of claim 1, wherein the first codebook is designed to be generally orthogonal in angular space to the second codebook.

5. The base station of claim 1 wherein the geographic criteria comprises a geographical proximity between the first user and the second user in the cell.

6. The base station of claim 5, wherein the geographical proximity is ascertained using GPS techniques.

7. The base station of claim 1, wherein each of the first codebook and the second codebook respectively includes four beams.

8. The base station of claim 1, wherein the allocation of the second codebook is further based on detecting that uplink signals received from the first and second users in the cell have similar angles of arrival.

9. The based station of claim 1, wherein the interference results from the first user and the second user falling within a same beam such that the first user and the second user cannot be adequately separated.

10. A method for communicating data to a plurality of users in a cell associated with a base station, the method comprising:
    allocating, from the base station, a first codebook of a plurality of codebooks to a first user of the plurality of users in the cell, wherein the first codebook of the plurality of codebooks defines a first set of beam patterns having a first granularity in angular space;
    allocating, from the base station, a second codebook of the plurality of codebooks to a second user of the plurality of users in the cell, wherein the second codebook of the plurality of codebooks defines a second set of beam patterns having a second granularity in angular space, wherein the second granularity is finer relative to the first granularity, the allocation of the first codebook to the first user and the second codebook to the second user based on geographic criteria indicating allocation of a same codebook to the first user and the second user would cause interference in wireless data communication;
    communicating data, from the base station to the first user, in accordance with one or more of the first set of beam patterns defined by the first codebook; and communicating data, at a same time as the communication to the first user, from the base station to the second user, in accordance with one or more of the second set of beam patterns defined by the second codebook.

11. The method of claim 10, wherein allocating the second codebook is responsive to the first user satisfying a geographical proximity criteria relative to the second user.

12. The method of claim 10, wherein the first and second codebooks are of a same family of codebooks.

13. The method of claim 10, wherein the first and the second codebooks each provide a set of pre-coding vectors used to provide the first and second beam patterns.

14. The method of claim 10, wherein the first user and the second user in the cell are mobile receivers capable of receiving data wirelessly communicated by the base station.

15. The method of claim 10, wherein the allocating the second codebook is further based on detecting that uplink signals received from the first and second users in the cell have similar angles of arrival.

* * * * *